United States Patent [19]

Sielfeld

[11] Patent Number: 4,659,794
[45] Date of Patent: * Apr. 21, 1987

[54] PROCESS FOR THE POLYMERIZATION OF POLYMERS OF VINYL CHLORIDE

[75] Inventor: Gilbert Sielfeld, Marl, Fed. Rep. of Germany

[73] Assignee: Huels Aktiengesellschaft, Marl, Fed. Rep. of Germany

[ * ] Notice: The portion of the term of this patent subsequent to Jun. 25, 2002 has been disclaimed.

[21] Appl. No.: 698,274

[22] Filed: Feb. 5, 1985

Related U.S. Application Data

[63] Continuation of Ser. No. 446,101, Dec. 2, 1982, abandoned.

[30] Foreign Application Priority Data

Dec. 2, 1981 [DE] Fed. Rep. of Germany ....... 3147672

[51] Int. Cl.$^4$ ................................................ C08F 2/20
[52] U.S. Cl. ...................................... 526/200; 526/201
[58] Field of Search ................................ 526/200, 201

[56] References Cited

U.S. PATENT DOCUMENTS 3,358,054 12/1967 Hardt et al.
4,011,388 3/1977 Murphy ............................... 526/201
4,345,056 8/1982 Thyret ................................. 526/200

FOREIGN PATENT DOCUMENTS 152346 11/1981 Fed. Rep. of Germany ...... 526/201
41010 12/1971 Japan ................................... 526/201
1164008 9/1969 United Kingdom .
1224693 3/1971 United Kingdom ................ 526/201

Primary Examiner—Christopher Henderson
Attorney, Agent, or Firm—Millen & White

[57] ABSTRACT

A process for the production of polymers of vinyl chloride by suspension polymerization, uses as the suspension stabilizer either (A) a methylhydroxypropylcellulose with a methoxy substitution degree of 20-32%, a hydroxypropoxy substitution degree of 2-10%, and a viscosity of 30-70 mPa.s; and/or (B) a suspension agent combination consisting essentially of:
  (a) methylcellulose with a methoxy substitution degree of 22-34% and a viscosity of 7-20 mPa.s, and
  (b) methylcellulose with a methoxy substitution degree of 22-34% and a viscosity of 50 mPa.s-4,000 mPa.s and/or methylhydroxypropylcellulose with a methoxy substitution degree of 20-32%, a hydroxypropoxy substitution degree of 2-10%, and a viscosity of 100-3,000 mPa.s, and polymerizes in the presence of 0.4-8% by weight of an ethylene-vinyl acetate copolymer. The resultant polymers are suitable for lowering viscosity of polyvinyl chloride plastisols.

13 Claims, No Drawings

PROCESS FOR THE POLYMERIZATION OF POLYMERS OF VINYL CHLORIDE

This application is a continuation, of application Ser. No. 446,101, filed Dec. 2, 1982, now abandoned.

CROSS REFERNCE TO RELATED APPLICATIONS

This application is related to commonly assigned copending applications Ser. Nos. 409,795, now U.S. Pat. No. 4,525,559 and 409,796, now U.S. Pat. No. 4,540,759 both filed on Aug. 20, 1982.

BACKGROUND OF THE INVENTION

The present invention relates to the production of a fine-grained vinyl chloride suspension polymer and its use as a viscosity-lowering agent in polyvinyl chloride plastisol processing.

Polyvinyl chloride plastisols or polyvinyl chloride pastes are generally understood to mean dispersions of fine polyvinyl chloride powders in plasticizers. Suitable paste-forming types of polyvinyl chloride include emulsion polymers and, in particular, also microsuspension polymers.

These polyvinyl chloride products are obtained after polymerization in latex form and are processed, generally, by spray-drying into agglomerated secondary particles (plastisol grades). During plastisol processing, these agglomerates disintegrate predominantly into primary particles. The degree of such disintegration and the particle size distribution of the primary particles determine the flow properties of the paste.

Polyvinyl chloride plastisols or pastes are utilized primarily as spread-coating pastes, as dip-coating pastes and casting pastes, and as molding pastes for a great variety of finished articles.

In general, pastes of low viscosities are desirable for the manufacture of finished articles low in plasticizer. It is known for this purpose to lower the paste viscosity by the addition of fine-grained suspension polyvinyl chloride products (so-called extender polyvinyl chloride) which are not paste-forming and which are dissolved only at the gelling temperature.

According to German Patent No. 1,645,668, it is possible to produce such suspension polymers for lowering the viscosity of polyvinyl chloride plastisols using methylhydroxypropylcelluloses having a viscosity of 50–500 mPa.s at 20° C. in a 2% by weight solution, as the only suspension stabilizer, and using monomer-soluble catalysts.

However, as can be seen from Comparative Example A (in accordance with German Patent No. 1,645,668 with a methylhydroxypropylcellulose as the suspension stabilizer, having a viscosity of 100 mPa.s at 20° C. in a 2% by weight solution), the thus-produced polymers contain a considerable proportion of coarse grains having particle sizes above 100 μm. This causes an undesirable sedimentation of the coarse proportion and, therefore, difficulties in processing. Furthermore, the coarse proportion results in an undesirably rough surface, especially when applying very thin coatings.

As can be seen from Comparative Example B (also according to German Pat. No. 1,645,668), finely divided polyvinyl chloride polymers can be prepared by suspension polymerization in the presence of a methylhydroxypropylcellulose having, in a 2% by weight solution, a viscosity of 50 mPa.s at 20° C. The thus-produced polymer is suitable, on account of its fineness and its minimum proportion of coarse particles (>100 μm), for thin coatings and does not tend toward sedimentation. However, due to its very high granular porosity, the resultant product provides inadequate lowering of paste viscosity. It does not satisfy present requirements under practical conditions.

SUMMARY OF THE INVENTION

Accordingly, it is an object of this invention to provide a process for producing suspension polyvinyl chloride which does not possess these disadvantages.

Upon further study of the specification and appended claims, further objects and advantages of this invention will become apparent to those skilled in the art.

These objects have been attained by providing a process for the production of polymers and copolymers of vinyl chloride by suspension polymerization in the presence of monomer-soluble catalysts and one or several suspension stabilizers and, optionally, pH buffer systems, wherein the suspension stabilizer is (A) methylhydroxypropylcellulose having a methoxyl substitution degree of 20–32%, a hydroxypropoxy substitution degree of 2–10%, and a viscosity of 30–70 mPa.s (measured in a 2% aqueous solution at 20° C., Ubbelohde capillary viscometer); and/or (B) a suspension agent combination consisting essentially of:

(a) methylcellulose with a methoxyl substitution degree of 22–34% and a viscosity of 7–20 mPa.s (measured in a 2% aqueous solution according to Brookfield at 20° C. and 20 rpm) and (b) methylcellulose having a methoxyl substitution degree of 22–34% and a viscosity of 50 mPa.s to 4,000 mPa.s (measured in a 2% by weight aqueous solution according to Brookfield at 20° C. and 20 rpm) and/or methylhydroxypropylcellulose having a methoxyl substitution degree of 20–32%, a hydroxypropoxy substitution degree of 2–10%, and a viscosity of 100–3,000 mPa.s (measured in a 2% aqueous solution according to Brookfield at 20° C. and 20 rpm), and wherein the polymerization is conducted in the presence of 0.4–8% by weight, based on the amount of monomer, of an ethylene-vinyl acetate copolymer with a vinyl acetate content of 38–55% by weight and with a viscosity number of 95–200 ml/g (measured in toluene in a concentration of 0.005 g/cc at 25° C.).

Detailed Discussion

According to this invention, suitable suspension stabilizers or protective colloids include methylhydroxypropylcelluloses having methoxyl substitution degrees of 20–32%, preferably 22–30 %, and hydroxypropoxy substitution degrees of 2–10%, preferably 2–9%, and viscosities of 30–70, preferably 40–60 mPa.s (measured in a 2% by weight aqueous solution, Ubbelohde capillary viscometer at 20° C.). They are ordinarily utilized in amounts from 0.15 to 1.5% by weight, preferably 0.3–1% by weight, based on the amount of monomer.

Protective colloids according to this invention also include methylcelluloses having a methoxyl substitution degree of 22–34%, preferably 24–32 %, by weight and a viscosity of 7–20 mPa.s, preferably 10–15 mPa.s (measured in a 2% by weight aqueous solution according to Brookfield at 20° C. and 20 rpm), in combination with methylcelluloses having a methoxyl substitution degree of 22–34%, preferably 24–32 %, by weight and a viscosity of 50 mPa.s–4,000 mPa.s, preferably 350–1,600 mPa.s (measured in a 2% by weight aqueous solution according to Brookfield at 20° C. and 20 rpm) and/or methylhydroxypropylcelluloses having a methoxyl substitution degree of 20-32%, preferably 22-30 %, a hydroxypropoxy substitution degree of 2-10%, preferably 2-9 %, and a viscosity of 10-3,000 mPa.s, preferably 350-1,600 mPa.s (measured in a 2% aqueous solution according to Brookfield at 20° C. and 20 rpm). The low-viscosity methylcelluloses (7-20 mPa.s) are usually employed in amounts from 0.3 to 1.5% by weight, preferably 0.4-1.2% by weight, based on the amount of monomers. The high-viscosity methylcelluloses and/or high-viscosity methylhydroxypropylcelluloses are ordinarily employed in amounts from 0.01 to 0.2% by weight, preferably 0.02-0.15% by weight, based on the amount of monomers. When both stabilizer A and stabilizer B are used, the same ranges apply for each component but the total of A and B is usually 0.35-1.2% by weight, preferably 0.4-1.0 % by weight, based on the amount of monomers.

Suitable ethylene-vinyl acetate copolymers are those composed of 38-55%, preferably 42-48%, by weight of vinyl acetate, remainder ethylene, and having a viscosity number of 95-200 ml/g, preferably 110-160 ml/g, measured in toluene in a concentration of 0.005 g/cc at 25° C. These are utilized in amounts from 0.4 to 8% by weight, preferably 0.6-3% by weight, based on the weight of monomer or monomer mixture. They can be introduced into the polymerization reactor in solid form or in the form of a solution, e.g., 0.4-30 wt. % in monomer.

Suitable ethylene-vinyl acetate copolymers are commercially obtainable under the trade name LEVAPREN. They can be fully conventionally produced by free radical polymerization in solution under a pressure of 100-400 bar and at a temperature of 30°-250° C., for example according to German Patent No. 1,126,613, whose disclosure is incorporated by reference herein.

Suitable catalysts include the oil-soluble catalysts customarily employed in vinyl chloride suspension polymerization, such as diacyl peroxides, peroxydicarbonates, alkyl peresters, or azo compounds, such as, for example, diacetyl, dibenzoyl, dilauroyl, 2,4-dichlorobenzoyl peroxide; peroxydicarbonates, such as diisopropyl, dicyclohexyl, di-tert-butylcyclohexyl, diethylcyclohexyl, distearyl peroxydicarbonate; peresters, such as isopropyl, tert-butyl peracetate, tert-butyl peroctoate, tert-butyl perpivalate, tert-butyl perneodecanoate, isoamyl perneodecanoate; mixed anhydrides of organic sulfo peracids and organic acides, such as, for example, acetylcyclohexylsulfonyl peroxide; azo compounds, such as, for example, azobisisobutyronitrile and azobisdimethylvalerodinitrile. However, for reasons of industrial safety, especially suitable initiators are those which are solid at room temperature and display shelf stability. Examples of suitable, shelf-stable initiators include lauroyl peroxide, bis(4-tert-butylcyclohexyl) peroxydicarbonate, dimyristyl peroxydicarbonate, dicetyl peroxydicarbonate, bis(2-methylbenzoyl) peroxide. The catalysts can be used singly or in admixture, the usual amounts being 0.01-0.3% by weight, preferably 0.01-0.2% by weight, based on the weight of monomer.

Additional conventional polymerization aids can also optionally be used, e.g., pH buffering systems, such as ammonium salts, ammonia, or alkali metal carbonates, chain regulators, such as, for example, aliphatic aldehydes, trichloroethylene, auxiliary agents to lessen wall deposits, antioxidants, etc. These are used in fully conventional amounts, e.g., 0.01-2.0 wt. % based on the weight of monomers. The polymerization can be conducted at the usual temperatures of 30° to 80° C., preferably 45°-75° C. and under the corresponding pressures.

The use of up to 30% by weight of the usual monomers polymerizable with vinyl chloride is possible for producing copolymers. Examples for suitable comonomers include vinyl esters, such as vinyl acetate, vinylidene halogenides, such as vinylidene chloride, acrylic acid alkyl esters and methacrylic acid alkyl esters of 1-18 carbon atoms in the alkyl residue, such as the methyl, n-butyl, and lauryl esters, esters of maleic acid, such as diethyl, dipropyl maleate, and, finally, monoolefins, such as ethylene or propylene.

The suspension polymers of this invention are worked up according to conventional methods. For example, the usually degasified aqueous polyvinyl chloride suspension can first of all be dewatered in a centrifuge, optionally washed with pure water, and then can be fed to a flash dryer. Optionally, a further drying step can be carried out in a drum dryer.

The polymers produced by this invention can be employed as the viscosity-lowering medium in conjunction with 95-45% by weight, preferably 90-50% by weight of paste-forming polyvinyl chloride, such as emulsion or microsuspension polyvinyl chloride. The types of polyvinyl chloride which form pastes with plasticizers and other additives and which, of course, are conventionally used in this connection, are emulsion or microsuspension polymers. Emulsion polyvinyl chloride can be fully conventionally prepared as described in the monograph by Kainer, "Polyvinylchlorid und Vinylchlorid-Mischpolymerisate" [Polyvinyl Chloride and Vinyl Chloride Copolymers], Springer Publishers Berlin/Heidelberg/New York (1965), pages 34 et seq., which is incorporated by reference herein.

Microsuspension polyvinyl chloride can be produced by processes according to which the vinyl chloride, optionally together with other monomers, is homogenized, prior to being heated to the polymerization temperature, in water containing ionic and, if desired, nonionic emulsifiers, to form a stable monomer dispersion. The latter is polymerized in a manner known per se with the aid of monomer-soluble polymerization catalysts. Processes based on this mode of operation are described, for example, in German Pat. No. 962,834 and 1,069,387, as well as in British Pat. No. 698,359, all of which are incorporated by reference herein.

The production of polyvinyl chloride pastes is well-known and described in the Kainer monograph, "Polyvinylchlorid und Vinylchlorid-Mischpolymerisate," Springer Publishers, Berlin/Heidelberg/New York (1965), pages 332-343, which is also incorporated by reference herein.

Unless indicated otherwise herein, the production of the suspension polyvinyl chloride is fully conventional and described, for example, in the above mentioned Kainer monograph, pages 12-84, which is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 40-liter polymerization autoclave of stainless steel, equipped with impeller agitator and Pfaudler baffle, was charged with the following components: 17,000 parts of water, 10 parts of sodium carbonate, 100 parts of a methylcellulose having a methoxy substitution degree of 28% and a viscosity of 12 mPa.s (measured in a 2% by weight aqueous solution according to Brookfield at 20° C. and 20 rpm) dissolved in 750 parts of water, 10 parts of a methylcellulose having a methoxy substitution degree of 28% and a viscosity of 400 mPa.s (measured in a 2% by weight solution according to Brookfield at 20° C. and 20 rpm) dissolved in 750 parts by water, 3.4 parts of dicetyl peroxydicarbonate, 6 parts of dilauroyl peroxide, and 150 parts of an ethylene-vinyl acetate copolymer having a vinyl acetate content of 45% by weight and a viscosity number of 138 ml/g (measured in toluene in a concentration of 0.005 g/cc at 25° C.). The reactor was sealed, purged with nitrogen, evacuated, then charged with 11,200 parts of vinyl chloride, and stirred for two hours at room temperature to dissolve the ethylene-vinyl acetate copolymer. Thereafter, the polymerization was carried out at a temperature of 60° C. up to a pressure of 5 bar. The product was separated from the largest portion of the suspension water after degasification, rinsed with water, and dried at 50° C. in a fluidized bed dryer. As can be seen from Table 1, an extremely fine product results which, in a blend with paste-forming PVC, effects a marked reduction in paste viscosity.

EXAMPLE 2

The procedure of Example 1 was followed, except for using 70 parts of methylcellulose having a methoxy substitution degree of 28% and a viscosity of 12 mPa.s. As can be derived from Table 1, the resultant product has a very fine grain and a pronounced viscosity-lowering property when blended with paste-forming PVC.

EXAMPLE 3

The process was conducted as described in Example 1, but using 60 parts of methylcellulose having a methoxy substitution degree of 28% and a viscosity of 12 mPa.s. As can be seen from Table 1, the thus-prepared product has a very fine grain and a pronounced viscosity-lowering characteristic when blended with paste-forming PVC.

COMPARATIVE EXAMPLE A (According to German Patent No. 1,645,668)

The procedure of Example 1 was followed, but using instead of methylcellulose, 60 parts of a methylhydroxypropylcellulose with a methoxy substitution degree of 22.1% by weight, a hydroxypropyl content of 8.1% by weight, and a viscosity of 100 mPa.s (measured in an Ubbelohde capillary viscometer in a 2% by weight aqueous solution at 20° C.), dissolved in 1,500 parts of water, and polymerizing in the absence of ethylenevinyl acetate copolymer. As can be derived from Table 1 a product results having an undesired, high coarse proportion of particles above 100 μm. Moreover, the thus-prepared product provides an inadequate paste viscosity lowering effect when blended with paste-forming PVC.

EXAMPLE 4

The process was carried out as described in Example 1, but using 90 parts of methylcellulose having a methoxy substitution degree of 28% and a viscosity of 12 mPa.s and 200 parts of ethylene-vinyl acetate copolymer. As can be seen from Table 1, a very fine product results having a pronounced viscosity-lowering property.

EXAMPLE 5

The procedure of Example 4 was followed, but using 70 parts of methylcellulose having a methoxy substitution degree of 28% and a viscosity of 12 mPa.s. As can be seen from Table 1, here again a very fine product is obtained having a pronounced viscosity-lowering effect.

EXAMPLE 6

The procedure was conducted as in Example 2, but using, instead of 10 parts of methylcellulose having a viscosity of 400 mPa.s, 5 parts of a methylhydroxypropylcellulose having a methoxy substitution degree of 24%, a hydroxypropoxy substitution degree of 5%, and a viscosity of 1,700 mPa.s (measured in a 2% by weight aqueous solution according to Brookfield at 20° C. and 20 rpm). As can be derived from Table 1, a product again results having a fine grain and a pronounced viscosity-lowering property.

EXAMPLE 7

The process was conducted as in Example 1, but using, instead of the methylcelluloses, 80 parts of a methylhydroxypropylcellulose with a methoxy substitution degree of 28.5%, a hydroxypropoxy substitution degree of 5%, and a viscosity of 50 mPa.s (measured in a 2% by weight aqueous solution at 20° C. with an Ubbelohde capillary viscometer), and 100 parts of ethylene-vinyl acetate copolymer. As can be seen from Table 1, a fine product results having a pronounced viscosity-lowering effect.

COMPARATIVE EXAMPLE B (According to German Patent No. 1,645,668)

The process of Example 7 was repeated, but the polymerization was conducted in the absence of the ethylene-vinyl acetate copolymer. As shown in Table 1, a fine product results, but with a markedly deficient viscosity-lowering activity.

EXAMPLE 8

A 40-liter polymerization autoclave of stainless steel, equipped with impeller agitator and Pfaudler baffle, was charged with the following ingredients: 20,000 parts of water, 1,800 parts of vinyl acetate, 13 parts of lauroyl peroxide, 80 parts of the methylhydroxypropylcellulose utilized in Example 7, dissolved in 1,600 parts of water, and 100 parts of the ethylene-vinyl acetate copolymer utilized in Example 1. The reactor was sealed, purged with nitrogen, evacuated, then charged with 10,000 parts of vinyl chloride, and stirred for 2 hours at room temperature to dissolve the ethylene-vinyl acetate copolymer. Then the polymerization was conducted at a temperature of 60° C. to a pressure of 5 bar. The product, after degasification, was separated from the largest portion of the suspension water, rinsed with water, and dried at 50° C. in a fluidized-bed dryer.

As can be derived from Table 1, a fine product results which in a blend with paste-forming PVC effects a marked lowering of paste viscosity.

COMPARATIVE EXAMPLE C

The process of Example 8 was conducted, but the polymerization was carried out in the absence of the ethylene-vinyl acetate copolymer. As can be seen from Table 1, the thus-prepared product exhibits a clearly deficient viscosity-lowering property.

ous solution according to Brookfield at 20° C. and 20 rpm), or methylhydroxypropylcellulose having a methoxy substitution degree of 20–32%, a hydroxypropoxy substitution degree of 2–10%, and a viscosity of 100–3,000 mPa.s (measured in a 2% aqueous solution according to Brookfield at 20° C. and 20 rpm), or a mixture thereof;

or a miture of A and B;

and wherein the polymerization is conducted in the

TABLE 1

|  | Particle Size Distribution, Sieve Analysis in % by Weight at Mesh | | | | Powder Density (1) [g/l] | Plasticizer Absorption (2) [g DOP / 100 g PVC] | Paste Viscosity (3) in dPa · s at Shear Rates | | | | Tear Strength (4) [N/mm²] | Elongation at Rupture (4) [%] |
|---|---|---|---|---|---|---|---|---|---|---|---|---|
|  | 40 μm | 63 μm | 100 μm | 160 μm |  |  | 0.3s⁻¹ | 1s⁻¹ | 10s⁻¹ | 100s⁻¹ |  |  |
| (3092) Example 1 | 3.0 | 0.1 |  |  | 650 | 6.8 | 85 | 90 | 112 | 136 | 15.8 | 173 |
| (3108) Example 2 | 17 | 0.5 |  |  | 670 | 5.8 | — | 67 | 83 | 102 | 15.9 | 147 |
| (3109) Example 3 | 18 | 0.8 |  |  | 695 | 5.9 | — | 56 | 79 | 99 | 16.4 | 156 |
| Comp. Example A | 84 | 58 | 5.1 | 0.2 | 574 | 13.8 | 208 | 208 | 223 | — | 11.9 | 112 |
| (3113) Example 4 | 8.0 | 0.8 |  |  | 650 | 6.6 | 84 | 81 | 98 | 120 | 14.3 | 121 |
| (3126) Example 5 | 13.0 | 0.6 |  |  | 656 | 5.8 | 87 | 76 | 89 | 108 | 18.3 | 213 |
| (3127) Example 6 | 35 | 2.7 | 0.1 |  | 669 | 5.7 | 82 | 80 | 94 | 110 | 16.6 | 177 |
| (3227) Example 7 | 29 | 2.0 | 0.1 |  | 650 | 5.5 | 91 | 83 | 93 | 107 | 11.6 | 100 |
| (3312) Comp. Example B | 59 | 2.8 | 0.5 |  | 565 | 9.4 | 406 | 433 | 534 | 529 | 16.8 | 185 |
| (3112) Example 8 | 16 | 1.5 | 0.1 |  | 640 | 6.5 | 139 | 127 | 146 | 139 | 19.0 | 241 |
| (3111) Comp. Example C | 13 | 1.8 | 0.4 |  | 560 | 8.7 | 480 | 404 | 446 | 465 | 18.3 | 238 |

(1) According to DIN 53 468
(2) According to DIN 53 417/1 (centrifuging method)
(3) Paste recipe:
50 parts by weight of microsuspension polyvinyl chloride
50 parts by weight of polyvinyl chloride produced according to this invention
38 parts by weight of di (2-ethylhexyl) phthalate
2 parts by weight of Ba/Cd/Zn stabilizer
Paste viscosity was measured in a "Rheomat" (Contraves Company) after a storage period of 24 hours.
(4) Gelling capacity of paste (after venting) was measured on 1 mm pressed plates (gelling time of 1 minute at 170° C.) according to DIN 53 455 (tensile strength test).
The tear strength values and the elongation at rupture values are averaged from 7 measured values.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a homopolymer or copolymer of vinyl chloride comprising suspension polymerizing vinyl chloride monomer and a comonomer when a copolymer is produced, in the presence of a monomer-soluble catalyst, and a suspension stabilizer, wherein the suspension stabilizer is a suspension stabilizing effective amount of (A) methylhydroxypropylcellulose having a methoxy substitution degree of 20–32%, a hydroxypropoxy substitution degree of 2–10%, and a viscosity of 30–70 mPa.s (measured in a 2% aqueous solution at 20° C., Ubbelohde capillary viscometer);

(B) a combination of:
 (a) methylcellulose with a methoxy substitution degree of 22–34% and a viscosity of 7–20 mPa.s (measured in a 2% aqueous solution according to Brookfield at 20° C. and 20 rpm) and
 (b) methylcellulose having a methoxy substitution degree of 22–34% and a viscosity of 50 mPa.s to 4,000 mPa.s (measured in a 2% by weight aquepresence of 0.4–8% by weight, based on the weight of monomer, of an ethylene-vinyl acetate copolymer with a vinyl acetate content of 38–55% by weight and an ethylene content of 62–45% by weight and with a viscosity number of 95–200 ml/g (measured in toluene in a concentration of 0.005 g/cc at 25° C.).

2. A process of claim 1, wherein the suspension stabilizer is 0.15–1.5% by weight, based on the weight of monomer, of a methylhydroxypropylcellulose with a methoxyl substitution degree of 20–32% and a hydroxypropoxy substitution degree of 2–10% and a viscosity of 30–70 mPa.s (measured in a 2% by weight aqueous solution with an Ubbelohde capillary viscometer).

3. A process of claim 1, wherein the suspension stabilizer is a combination of:
 (a) 0.3–1.5% by weight, based on the weight of monomer, of a methylcellulose having a methoxyl substitution degree of 22–34% and a viscosity of 7–20 mPa.s (measured in a 2% by weight aqueous solution according to Brookfield at 20° C. and 20 rpm) and
 (b) 0.01–0.2% by weight, based on the weight of monomer, of a methylcellulose with a methoxyl substitution degree of 22–34% and a viscosity of 50–4,000 mPa.s (measured in a 2% by weight aqueous solution according to Brookfield at 20° C. and 20 rpm), or 0.01–0.2% by weight, based on the weight of monomer, of a methylhydroxypropylcellulose with a methoxyl substitution degree of 20–32%, a hydroxypropoxy substitution degree of 2-10%, and a viscosity of 100-3,000 mPa.s (measured in a 2% by weight aqueous solution according to Brookfield at 20° C. and 20 rpm), or a mixture thereof.

4. A process of claim 2, wherein the amount of suspension stabilizer is 0.3-1% by weight based on the weight of monomer.

5. A process of claim 3 wherein the amount of stabilizer (a) is 0.4-1.2% by weight and the amount of stabilizer (b) is 0.02-0.15% by weight, in each case based on the weight of monomers.

6. A process of claim 1, wherein the ethylenevinyl acetate copolymer has a vinyl acetate content of 42-48% by weight.

7. A process of claim 1, wherein the ethylene-vinyl acetate copolymer has a viscosity number of 110 ml/g to 160 ml/g (measured in toluene in a concentration of 0.005 g/cc at 25° C.).

8. A process of claim 2, wherein the ethylene-vinyl acetate copolymer has a viscosity number of 110 ml/g to 160 ml/g (measured in toluene in a concentration of 0.005 g/cc at 25° C.).

9. A process of claim 3, wherein the ethylene-vinyl acetate copolymer has a viscosity number of 110 ml/g to 160 ml/g (measured in toluene in a concentration of 0.005 g/cc at 25° C.).

10. A process of claim 1, wherein the amount of ethylene-vinyl acetate copolymer, based on the weight of monomer is 0.6-3% by weight.

11. A process of claim 1, wherein the polymerization is conducted in the presence of a pH buffer system.

12. A process of claim 1, wherein the polymerization temperature is 30°-80° C.

13. A process of claim 1, wherein the amount of co-monomer is up to 30% by weight of the total weight of monomers.

* * * * *